Nov. 8, 1960 A. G. THOMSON 2,959,669
CAB SIGNALLING SYSTEM FOR RAILROADS
Filed Jan. 27, 1958 6 Sheets-Sheet 1

FIG.1A.

INVENTOR.
A.G. THOMSON
BY
Forest B. Hitchcock
HIS ATTORNEY

Nov. 8, 1960 — A. G. THOMSON — 2,959,669
CAB SIGNALLING SYSTEM FOR RAILROADS
Filed Jan. 27, 1958 — 6 Sheets-Sheet 2

FIG. IB.

INVENTOR.
A. G. THOMSON
BY Forest B. Hitchcock
HIS ATTORNEY

Nov. 8, 1960   A. G. THOMSON   2,959,669
CAB SIGNALLING SYSTEM FOR RAILROADS
Filed Jan. 27, 1958   6 Sheets-Sheet 3

INVENTOR.
A. G. THOMSON
BY
Forest B. Hitchcock
HIS ATTORNEY

Nov. 8, 1960  A. G. THOMSON  2,959,669
CAB SIGNALLING SYSTEM FOR RAILROADS
Filed Jan. 27, 1958  6 Sheets-Sheet 4

INVENTOR.
A. G. THOMSON
BY Forest B. Hitchcock
HIS ATTORNEY

INVENTOR.
A. G. THOMSON
BY
HIS ATTORNEY

INVENTOR.
A. G. THOMSON

United States Patent Office 2,959,669
Patented Nov. 8, 1960

2,959,669

CAB SIGNALLING SYSTEM FOR RAILROADS

Alexander Gordon Thomson, Rochester, N.Y., assignor to General Railway Signal Company, Rochester, N.Y.

Filed Jan. 27, 1958, Ser. No. 711,433

4 Claims. (Cl. 246—34)

This invention relates to a cab signalling system for railroads using a two-rail alternating-current track circuit arranged for double direction running with coded energy being applied from either end according to the direction of traffic without exchanging the source of feed and the operating track relay.

The basic control for the cab signal is the automatic block signal system which is comprised of a series of consecutive blocks with a signal governing the entrance to each block. Each signal is controlled by a continuous track circuit of which each rail, insulated from the opposite rail as well as from the adjoining blocks, forms one side of the circuit. The track circuit is then completed by a track battery with D.C. operation or, as in the present disclosure by a track transformer with A.C. operation, such apparatus usually being located at the far or leaving end and a track relay at the near or receiving end. In the normal condition with the track unoccupied and the circuits closed, the track relay is energized. The signal is therefore automatically controlled through the track relay and can display a proceed indication only if the block is clear and safe for the passage of a train. If traffic in both directions is to be provided for, it has been necessary in the past to either provide duplicate equipment at both ends with the necessary selective controls; or, to provide pole changing means for at times exchanging the source of feed and the track relay in accordance with the direction of traffic.

It often happens that two spaced interlocking areas are connected by a stretch of single track over which it is expedient to have traffic pass in opposite directions at different times. The traffic over such a stretch may be jointly governed by the operators at the two interlocking areas, or may be governed by a single operator at some central point. Another means for controlling the traffic over such a stretch would be to utilize the automatic characteristics inherent in the usual centralized traffic control system. In any event, the system must be organized to govern the signals in such a manner that traffic can enter only at one end of the stretch of track at any one time. Also, when such a single track stretch extends for a considerable distance, it is often desirable to provide intermediate signals to allow for following train movements. Regardless of whether the stretch of track is occupied by one or more trains, the system must be organized to prevent the establishment of an opposing train movement until the stretch is completely unoccupied.

In the usual coded cab signalling systems of the nature hereinafter described, it has been necessary, in order to maintain the coded energy flow in a direction opposite that direction in which the train is progressing, to exchange, by pole changing or other means, the feed and operating relay whenever the direction of traffic is changed. That is, in order to have a cab signal display the proper track condition in advance of an oncoming train, the coded energy must be controlled by relay means in advance of the train. In the system hereinafter described, it is no longer necessary to have duplicate equipment at each end of the track sections or pole changing means for exchanging the source of feed and track relay to provide coded energy in the proper direction with respect to the direction of traffic.

Therefore, one object of the present invention is to provide a cab signalling system which permits double direction running but supplies the coded energy from either end of the system according to the direction of traffic without exchanging the source of feed and the track relay.

Another object of the present invention is to provide a system whereby the track relay, once deenergized, cannot be picked up until the vehicle has passed into the next track section in advance.

A still further object of the present invention is to provide coding circuit means applied to the rails of each section of track for picking up the track relay after being deenergized by the presence of a train if said train should not advance into the next adjacent section but should back out of the occupied section.

Other objects, purposes and characteristic features of the present invention will be in part obvious from the accompanying drawings, and in part pointed out as the description of the invention progresses.

In describing the invention in detail, reference will be made to the accompanying drawings, in which like reference characters have been provided to designate similar parts throughout the several views with these letter reference characters being given distinctive preceding numerals characteristic of the signal locations with which such parts are associated, and in which.

For the purpose of simplifying the illustration and explanation, the various parts and circuits constituting the embodiment of the invention have been shown diagrammatically and certain conventional illustrations have been employed, the drawings having been made more with the purpose in mind of making it easy to understand the principles and mode of operation, than with the idea of illustrating the specific construction and arrangement of parts that would be employed in practice. Thus, the relays and contacts are illustrated in a conventional manner and symbols are used to indicate the connections to the terminals of batteries, or other sources of electric current, instead of showing all of the wiring connections to these terminals. The symbols (BX) and (NX) are employed to indicate the positive and negative terminals respectively of a suitable source of alternating current energy, while the symbols (+) and (—) are employed to indicate the positive and negative terminals respectively of suitable batteries, or other sources of direct current. In the drawings, equipment is located at several different points along the trackway and it is assumed that suitable sources of direct current, as represented by the symbols, are provided at each of these different space points as required.

The system disclosed herein is a three-indication system but in accordance with the usual signaling practice, a multiple indication system in excess of that shown and described, can be adapted to the present system by merely using additional code frequencies. It is further understood that other means of conditioning the track circuits associated with the various track sections into which the stretch of track has been divided may be used in lieu of the manual controls indicated at each end of the stretch of track by the levers FS and ES.

Since the usual cab signaling system is a further development of the automatic block signal system with its signal controls transmitted from the track to the locomotive, by means of various wayside and locomotive equipment and circuits, where cab signals are installed supplementary to wayside signals, the wayside equipment includes the automatic block signal system with its track and line control circuits essentially the same, but, having coding equipment in addition thereto for the control of the cab signal. In the present disclosure the cab signals are not installed supplementary to wayside signals but the cab signals are used as the sole means of control over the single stretch of track shown in the drawings. This does not mean that the present cab signaling system cannot be installed supplementary to wayside signals if it is desired, since little additional equipment would be required for such combination.

Cab signaling systems generally use electrical energy having a frequency of 100 cycles to eliminate interference with the usual 25 and 60 cycle frequency commonly used for other industrial purposes. In areas where possible, however, 60 cycles or other frequencies may be used. This electrical energy is fed to the far or leaving end of each block through the medium of a code transmitter which produces a distinctive code in accordance with existing track and block conditions ahead. For example, the code for a clear indication is 180 interruptions per minute, the code for a caution indication is 75 interruptions per minute, and no code for a restrictive indication. If there is no use for the codes when the block is unoccupied, the code transmitter repeater is normally at rest but becomes operable, instantly, through the medium of a track relay deenergized, when a train enters the block.

Figure 3:
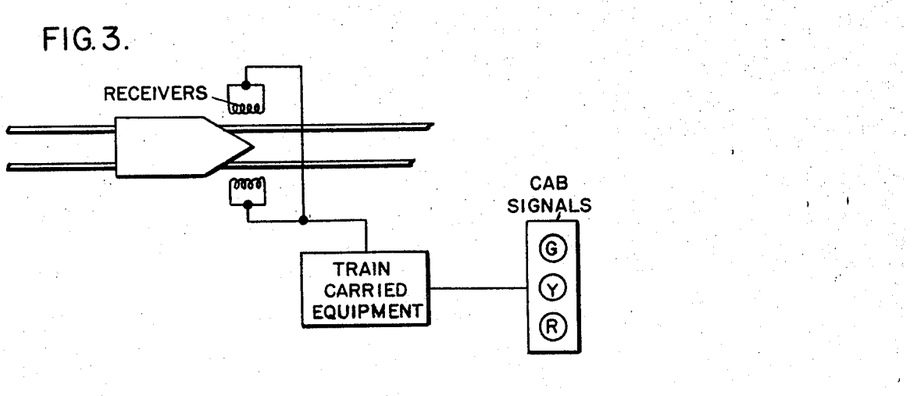
Fig. 3 is a block diagram representing one form that the usual train carried equipment may take along with an illustration of a three-indication cab signal arrangement.

The car carried equipment consists of apparatus for receiving and amplifying the coding signal present in the rail, duplicating and decoding the code, and among other things, operates a cab signal or other indicator which is mounted in the cab where it is readily visible to the motorman. For a three-indication system as disclosed herein, the cab signal is a three-aspect signal, each one of which when illuminated provides a particular aspect. Since there is no need for any alteration to be made in the usual car carried equipment, a block diagram as shown in Fig. 3 has been used to indicate that such car carried equipment is required.

Generally speaking, the system of the present invention provides four line wires between each signal location which may be used for clearing signals in either direction and at the same time provides sufficient control conditions thereover to effect the desired three-indication signaling system. This system organization remains in the condition for the direction of traffic last established but can be controlled at either end by the operator to establish track conditions for train movements entering the stretch of single track from that particular end. Such controls for a system organization have been fully described and disclosed in the prior patent to T. W. Tizzard, Jr., et al., Patent No. 2,739,230, dated March 20, 1956. The system can, of course, be controlled by a single operator at a central point providing suitable means is provided either at a central control office or in the corresponding field office to assure that the operator will endeavor to establish traffic in one direction only at any particular time.

Because the single stretch of track has been divided into a plurality of sections of varying length by insulated joints, the usual impedance or reactor bonds have been installed at the location of the various insulated rail joints to permit the continuous flow of alternating current energy on the track rails and further to permit continuous codes to be applied to the rails all in a manner explained later in this specification. Obviously, with direct current operation, impedance bonds would not be used.

As an aid to the understanding and explanation of the system disclosed in the present invention, reference numbers have been used along the single stretch of trackway which has been located between two interlocking areas, such reference characters being opposite to those locations where signals would normally be in a system including automatic block signals with its various intermediate counter parts. The reference characters 2, 4, 6 and 8 are used to indicate those locations where cab signal control of the associated track sections is effected, signal 2SG being an absolute signal located at the headblock and used for the purpose of controlling traffic in a west to east train movement. Reference characters 1, 3, 5 and 7 similarly identify locations in which cab signal control of the associated track sections is effected and signal 7SG is an absolute signal at the headblock for the purpose of controlling traffic entering into the stretch of single track during east to west train movements. For the purpose of the present discussion it is assumed that the last direction in which a train has passed through the stretch of single track was in an easterly direction. In this connection the H relays controlling the traffic from west to east will all be energized and the H relays controlling the traffic from east to west will all be deenergized. Regardless of the direction of the next train movement, it will be necessary to exercise some control or check of the condition of the system prior to permitting a train to enter the single stretch of track. Hence, at each end of the block a pair of levers FS and ES have been provided, which levers must be moved to either their left or righthand positions according to the desired direction of traffic.

Figure 1A:
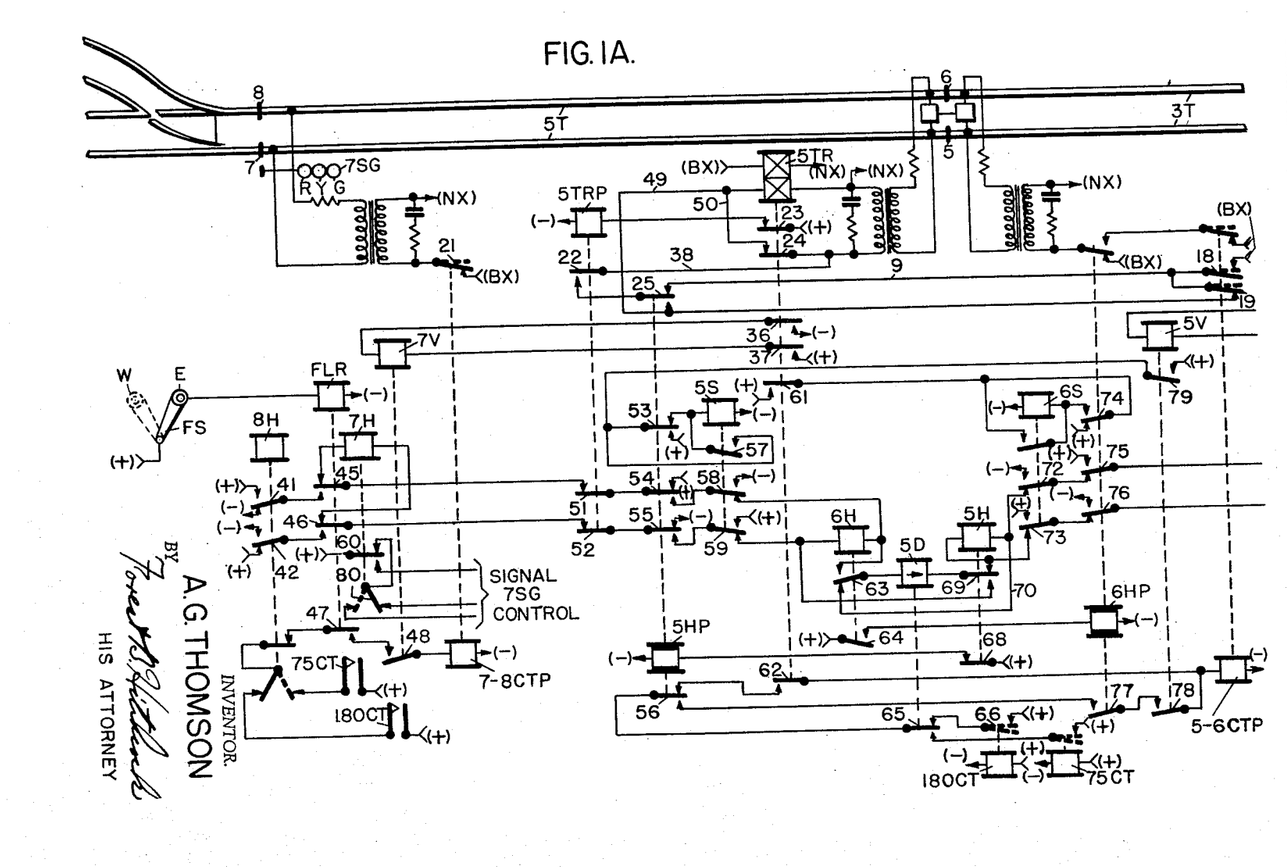
Figs. 1A and 1B, when placed end to end, illustrate diagrammatically one form of signaling system embodying the present invention.
Figure 1B:
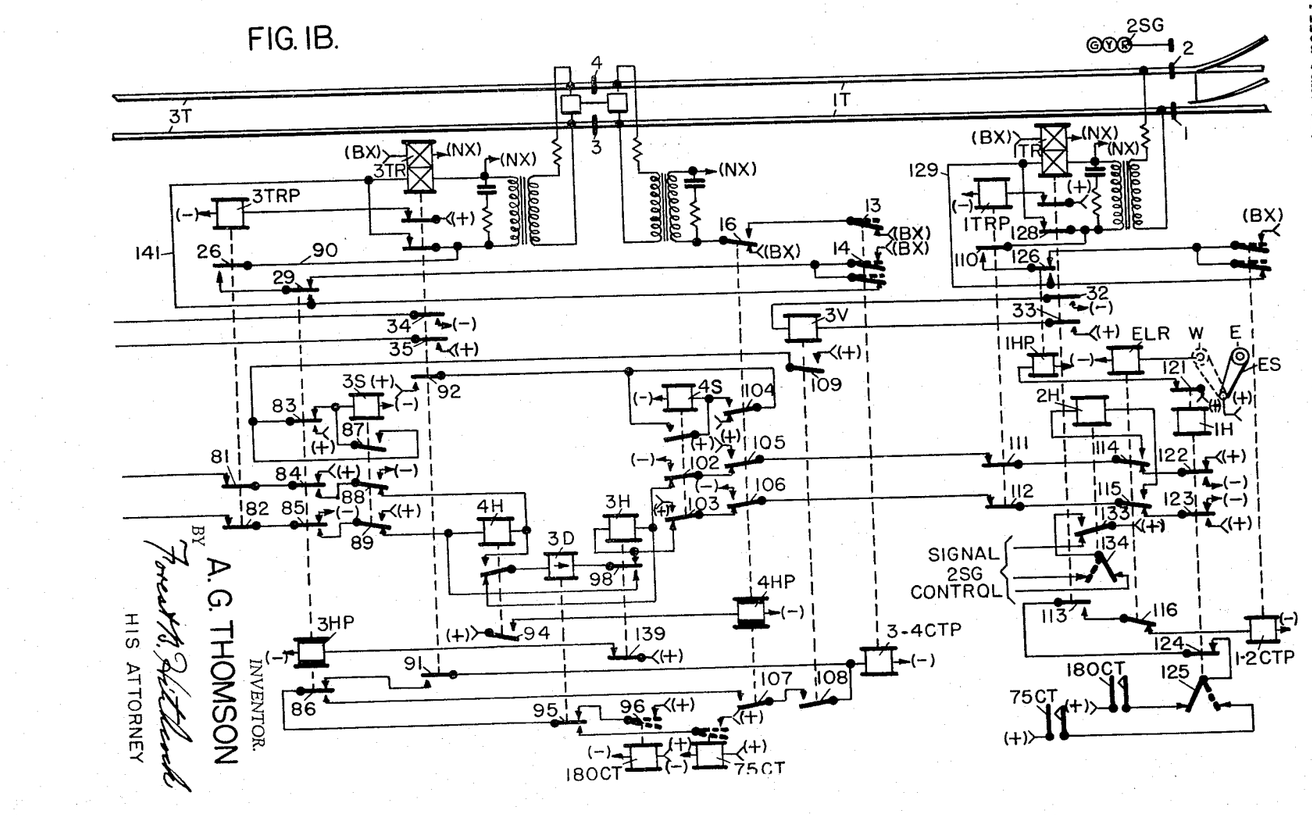

In describing the system disclosed in Figs. 1A and 1B, which when placed side by side, present one complete system organization to which the present disclosure is adaptable, it also has been found helpful to use the line diagrams as shown in Figs. 2A through 2J for the purpose of indicating the relative positions of the various H relays and the code which is applied to the various track sections, all in accordance with the passing of a train through the block. The system is arranged so that there is no code on any part of the stretch of single track as long as said stretch remains unoccupied. Hence, when movement in any particular direction is desired the operators actuate their respective levers which will condition the corresponding H relays in accordance with the direction of traffic chosen. Thus, when a train enters into the first track section, a 180 code will be placed on the track rails of that particular section, said 180 code being received, duplicated and decoded by the locomotive carried equipment all in a manner well known in the art, for the operation of the indicator or cab signal located in the cab. As the train progresses from section to section within a single stretch of track, a 180 code will be continuously received providing the stretch of single track is unoccupied in advance of the on-coming train. The track section immediately vacated by the train will supply no code to the rails, and therefore, would cause a stop aspect to register on the cab signal of any train which may happen to enter that particular track section. The track section immediately adjacent the track section which has just been vacated also would supply no code, however, if, as will be described in detail hereinafter, a following train movement were desired, this particular track section would supply a code having a 75 rate, such rate causing a caution aspect to show upon the cab signal. Such caution aspect would, of course, notify the engineer that there was another train in the stretch of single track in advance and would cause him to reduce his operating speed based upon the usual operating rules connected with such following train movements.

Figure 2A:
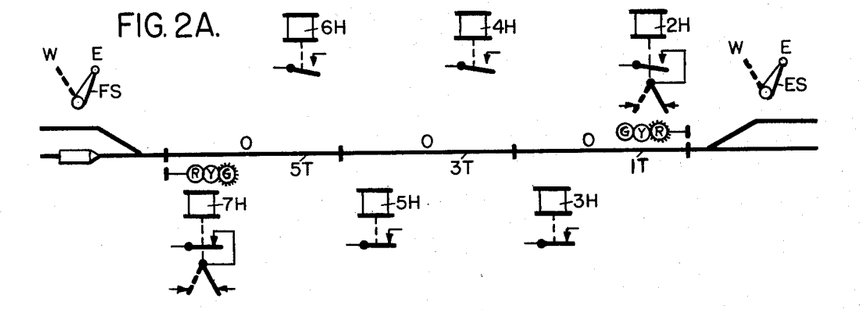
Figs. 2A through 2J illustrate by suitable symbols a schematic diagram of a stretch of track having the present invention applied thereto during the passage of a vehicle.
Figure 2B:
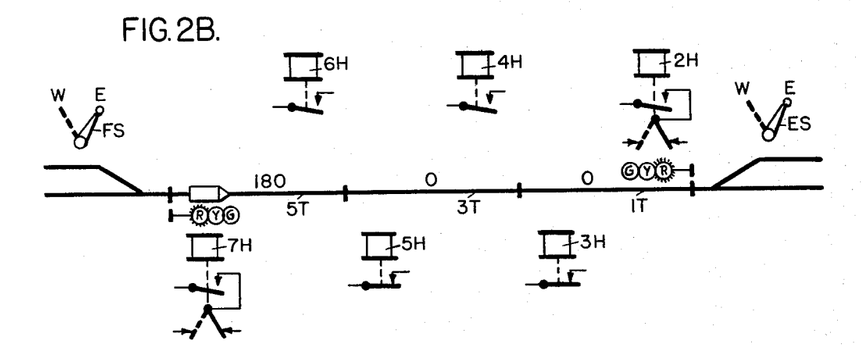
Figure 2C:
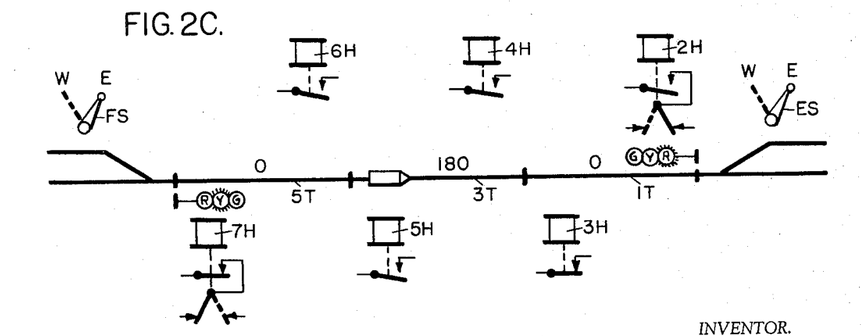
Figure 2D:
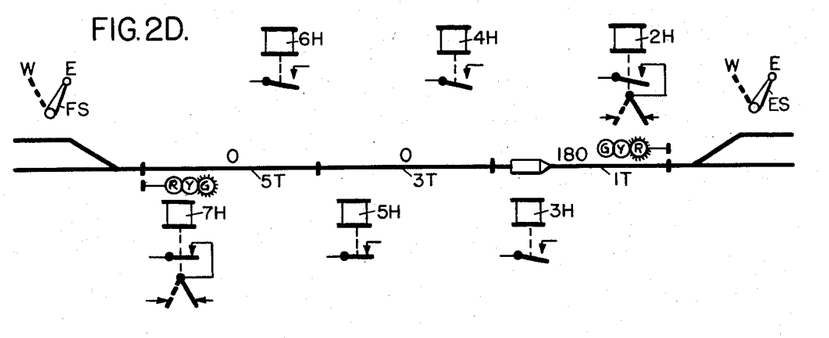
Figure 2E:
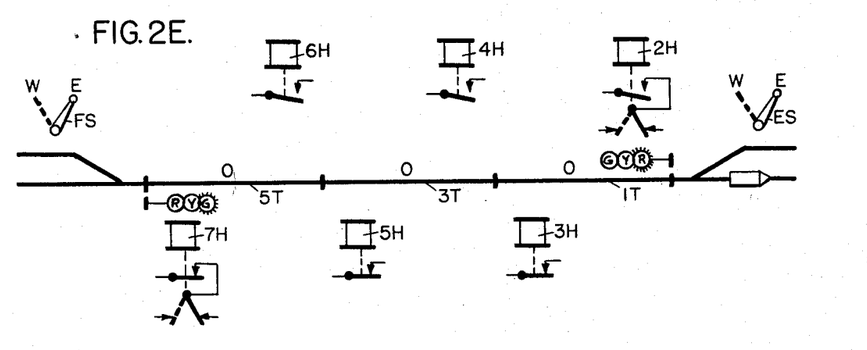
Figure 2F:
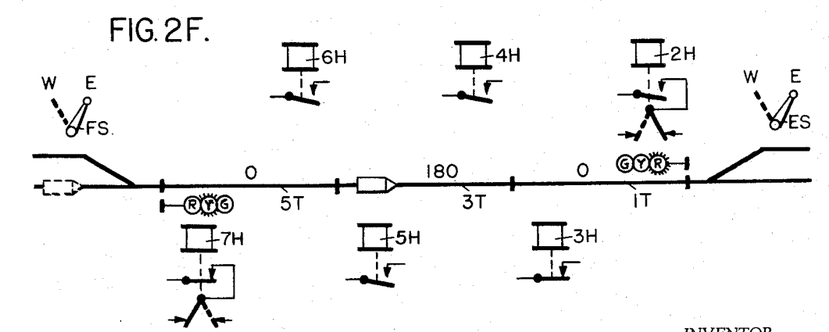

Therefore, considering first that a train has just passed through the block from east to west, and further, considering that the traffic from west to east is again desired, the levers FS and ES will be moved to their respective right-hand positions marked "E," in the event that they should for some reason not already be in the particular "E" position. It will be noted from the drawings in Figs. 1A and 1B that such movement of the levers energizes the relay FLR through a circuit from (+), through the winding of relay FLR, to (−), and correspondingly interrupts the energizing circuit for the relay ELR, thus deenergizing said latter relay. With relay FLR in the energized position, and with no train in the signaling block as shown in Fig. 2A, the energy on the respective track rails in the various track sections will be steady alternating current, and there will be no code on the rails since the respective code transmitters repeaters are in the deenergized position.

At this point, it should be noted that only one track relay is associated with each track section, such track relay being located at one end of a particular track section along with a track transformer and a track repeater relay. At the opposite end of each track section is also located a track transformer, the purpose of which will become apparent as the description progresses. These track relays are the usual alternating current relays and, since steady alternating current energy is on the rails of the single stretch of track, all of the track relays 1TR, 3TR and 5TR are in the energized position and their respective repeater relays likewise are energized. Further, since the last direction of traffic was in a direction from west to east, the corresponding relays 1H, 3H, 5H and 7H are also in the energized position in accordance with the last direction of traffic as stated above. Hence, the circuits of the cab signaling system are now set up for a movement of traffic from east to west. The corresponding relays 2H, 4H, 6H and 8H, used for governing traffic in the opposite direction are all deenergized when the sytem organization has been conditioned for a west to east movement.

The neutral relay 7H has been provided with at least one neutral contact 60 and a polar contact 80, the latter being operable to either a right or left-hand position in accordance with the polarity of the energizing circuit. Similarly, relay 2H has been provided with the same characteristic features. These two relays operate the signals at the headblocks and the operator controls the signals in accordance with the track conditions adjacent the single stretch of trackway. Since for demonstrative purposes, this system is primarily a three-indication system, it can be seen that when front contact 60 of relay 7H is closed and the polar contact 80 has been operated to its right-hand position, a green aspect will appear on the signal indicating that the track is clear and the vehicle may proceed. When front contact 60 of relay 7H is closed and the polar contact 80 is operated to its left-hand position, a yellow aspect will appear at the signal indicating that a vehicle may proceed under caution. Regardless of the position of the polar contact 80, when contact 60 of relay 7H is open, due to the deenergization of relay 7H, a red aspect will appear at the signal and must be interpreted as an absolute stop. The above discussion is also applicable to the operation of relay 2H and its respective contacts 133 and 134. Obviously, relays 2H and 7H could be a neutral-biased neutral combination similar to 5H, 6H, 5D, however, for convenience, the neutral relay with neutral and polar contacts have been used.

Considering now, that a train enters the stretch of single track, entering therefore into the track section 5T, the track relay 5TR is deenergized since its energizing circuit has been shunted. The dropping of the track relay 5TR also causes the repeater relay 5TRP to be deenergized interrupting the energizing circuit for the line relay 7H which controls the absolute signal 7SG at the headblock. With no code on the rails and no steady alternating current energy being applied, signal 7SG displays a stop aspect.

It should be pointed out with respect to Figs. 2A through 2J that relay 7H has been provided with a neutral contact and a polar contact for the purpose of providing at least three different signal aspects in accordance with the usual practice. In the schematic line diagrams shown in Figs. 2A–2J, these neutral and polar contacts of the relay 7H have been indicated to aid in the understanding of the operation of the system during the passage of a vehicle. If the movement were in the opposite direction, that is, from east to west, the analysis for relay 7H would likewise apply to relay 2H, however, since the operation for a train movement in the opposite direction is similar to the one to be described hereinafter, such detail for relay 2H has been omitted for convenience.

The dropping of the track relay 5TR closes back contacts 36 and 37 of relay 5TR to complete an energizing circuit for the relay 7V which in turn picks up its front contact 48 in the energizing circuit for the code transmitter repeater relay 7–8CTP. Since, however, the lever FS has been moved to the right-hand position E, the relay FLR is maintained energized and back contact 47 of relay FLR in the energizing circuit for the relay 7–8CTP is held open, preventing any code from being put on the rails of section 5T by means of contact 21 of the code transmitter repeater relay 7–8CTP.

It will be noted that a V relay has been provided at each location and that when a train enters that particular track circuit, the dropping of the track relay will pick up the associated V relay. The picking up of the particular V relay will energize the code transmitter repeater and put coded energy on the track transformer primary winding in place of steady energy and the use of such V relays for such purpose can be analyzed by assuming the direction of traffic to be from east to west. The reason that the V relays do not put coded energy on the track transformer primary winding in the instance explained is because special provisions are required for double direction running.

A biased neutral relay is associated with each track section. The energization of these biased neutral relays is dependent upon the condition of the corresponding track relay associated with the next two track sections in advance. One example of such biased neutral relay is relay 5D which is normally energized through a circuit from (+), through front contact 84 of repeater relay 3HP, front contact 81 of relay 3TRP, back contact 75 of the repeater relay 6HP, back contact 72 of the directional stick relay 6S, line wire 70, back contact 63 of line relay 6H, through the windings of relay 5D, through front contact 69 of line relay 5H, back contact 73 of relay 6S, back contact 76 of relay 6HP, front contact 82 of relay 3TRP, and front contact 85 of repeater relay 3HP, to (−). With such relay 5D energized, its front contact 65 is closed to partially complete an energizing circuit for the code transmitter repeater relay 5–6CTP, with code to be supplied by the code transmitter 180CT, by virtue of front contact 65 of relay 5D being now closed.

The dropping of the track relay 5TR, upon the entrance of a train into section 5T, closes back contact 62 of relay 5TR and, since front contact 56 of the repeater relay 5HP is maintained closed because the line relay 5H is energized in accordance with the trackway conditions established heretofore, the energizing circuit for the code transmitter repeater relay 5–6CTP is completed from (+), through coding contact 66 of the code transmitter 180CT, front contact 65 of the biased neutral relay 5D, front contact 56 of the line repeater relay 5HP, back contact 62 of track relay 5TR, through the windings of the code transmitter repeater relay 5–6CTP, to (−).

With coding contact 18 of the coding transmitter repeater 5–6CTP being alternately picked up and released at the selected 180 code rate, a 180 code is fed along the track rails of section 5T in advance of an on-coming vehicle by means of a circuit from (BX), through coding contact 18 of the code transmitter repeater 5–6CTP, front contact 25 of relay 5HP, back contact 22 of the track repeater relay 5TRP, line wire 38, through the primary winding of the associated track transformer, the code being induced into the secondary winding of the track transformer and onto the track rail circuit which includes the wheel shunt of the on-coming vehicle. Hence, a 180 code is fed along the track rails to the approaching vehicle, which code is picked up by the receiving apparatus included in the usual car carried equipment, such code being used to give a green aspect on the cab signal indicating that the stretch of track in advance is clear.

Further, the entrance of the vehicle into the track section 5T and the subsequent deenergization of the track relay 5TR also closes back contact 61 of relay 5TR to provide a pick-up circuit for the directional stick relay 6S. However, with back contact 74 of relay 6HP closed, the circuit obviously cannot be completed when the train is traveling in the prescribed direction.

Figure 2G:
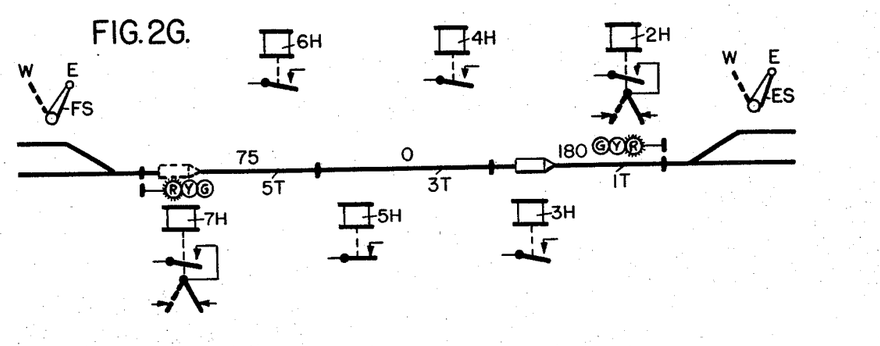
Figure 2H:
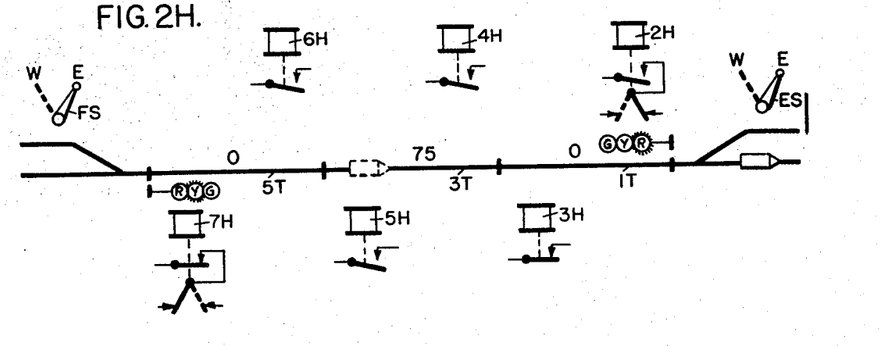
Figure 2I:
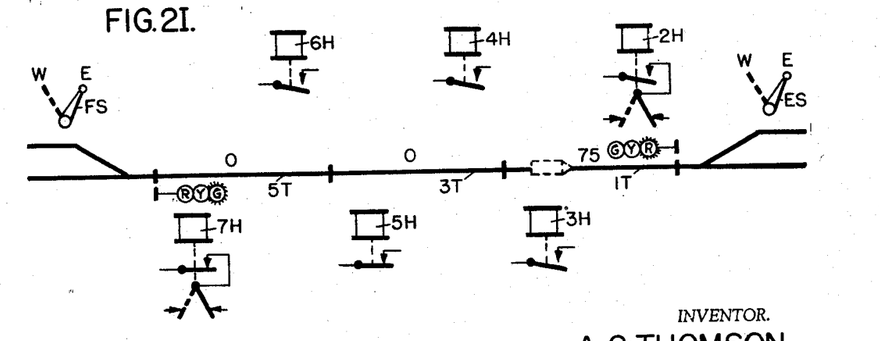
Figure 2J:
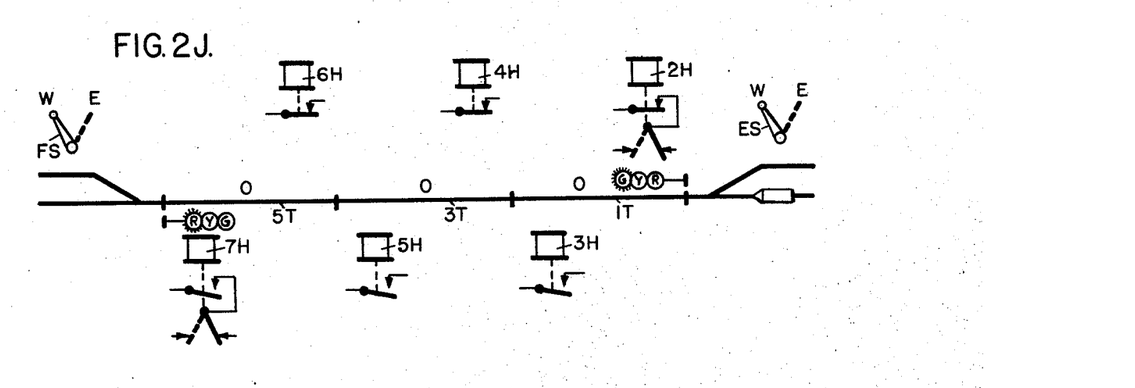

The relative positions of the various H relays controlling the application of the various code rates depending upon the direction of traffice and following train movements can readily be followed throughout the description of the operation by referring from time to time to the various schematic diagrams for Figs. 2A through 2J. Since the traffic has been assumed to be from west to east in both the foregoing train and the present one, the polar contact of the relay 7H has been shown in its particular operated position corresponding to the relative location of the vehicle in the block. Figs. 2A through 2E indicate the sequence of operation with a single vehicle passing through the block, while Figs. 2F through 2I indicate a following train movement. Fig. 2J shows the relative position of the H relays and the corresponding relays controlling the headblack signals along with their polar contacts when the manual levers FS and ES are operated to their left-hand positions to permit traffic from east to west as the case may be.

As the train moves from section 5T into section 3T the track relay 3TR is deenergized and its respective repeater relay 3TRP is also deenergized. Likewise, back contact 91 of relay 3TR is closed, and with the biased neutral relay 3D energized in accordance with the foregoing discussion relative to relay 5D, the energizing circuit for the code transmitter repeater relay 3–4CTP is completed whereby coding contact 14 is actuated to feed a 180 code along the track rails of section 3T, all in accordance with the above description relative to section 5T. The deenergizing of the track repeater relay 3TRP opens front contacts 81 and 82 of relay 3TRP interrupting the energizing circuits for the line relay 5H and the biased neutral relay 5D. With relay 5H deenergized, front contact 68 of relay 5H is open, interrupting the energizing circuit for the line repeater relay 5HP. Of course, when relay 5HP is deenergized, front contact 56 is opened thereby interrupting the coding circuit, and the code transmitter repeater 5–6CTP is deenergized, no further code being fed along the track rails of section 5T at this time. Relay 5D, being a biased neutral relay, drops away closing its back contact 65 connecting the code transmitter 75CT in the coding circuit. The code repeater 5–6CTP, however, remains deenergized because the line relay 6H which controls traffic in the opposite direction than that which has been assumed, is in its deenergized position so that its front contact 77 remains dropped away.

When relay 5HP is deenergized, back contact 25 of relay 5HP is closed to provide a pick-up circuit for the track relay 5TR. The pick-up circuit for the track relay 5TR is from the source located at the receiving end of the track section. More particularly, said pick-up circuit extends from (BX) through the associated track transformer located at the receiving end of section 5T, along the track rails, now unshunted, inducing a pick-up current through the associated track transformer located at the exit end of the track section 5T, all locations relative to the direction of traffic assumed. This induced current flows over wire 38, wire 49, and through the lower winding of the track relay 5TR, to (NX). At this point it should be understood that the track relays of any section in the single stretch of trackway, once deenergized, cannot be picked up until the vehicle has vacated that particular track section and the train has actually occupied the next track section in advance or has backed out of the section completing a second pick-up circuit as will be explained later.

With the track relay 5TR once again energized, it picks up its front contact 24 thereby maintaining its energizing circuit through a stick circuit arrangement including front contact 24. This stick circuit is required because front contact 23 of relay 5TR is likewise picked up, closing the pick-up circuit for the track repeater relay 5TRP which, when energized, picks up its front contact 22 which would interrupt the energizing circuit for the track relay 5TR if said relay were not now connected across the associated track transformer through its own front contact, as described. Such energizing circuit now extends from the secondary winding of the associated track transformer at the exit end of section 5T, through front contact 24 of relay 5TR, wire 50, and through the lower winding of relay 5TR, to (NX).

When the train moves into section 3T and the track relay 3TR is deenergized, its back contacts 34 and 35 are closed to provide a pick up circuit for relay 5V. When relay 5V is energized, it picks up its front contact 79 to provide an energized circuit for the directional stick relay 5S from (+), through front contact 79 of relay 5V, front contact 53 of repeater relay 5HP, prior to the deenergization of such repeater relay, then through the winding of relay 5S, to (−). Such energization of the stick relay 5S closes front contact 57. When the slower acting repeater relay 5HP then drops away its front contact 53 to interrupt the above described pick-up circuit, it closes its back contact 53 to provide a hold circuit for relay 5S from (+) through back contact 53 of relay 5HP, front contact 57 of relay 5S through the winding of relay 5S to (−). Hence, front contacts 58 and 59 of relay 5S remain closed.

With front contacts 58 and 59 of relay 5S closed, and back contacts 54 and 55 of the line repeater relay 5HP now closed due to the deenergization of the line relay 5H, all in accordance with the foregoing explanation, and further, with front contacts 51 and 52 of the track repeater relay 5TRP again picked up by the vacating of the track section 5T and the subsequent occupancy of track section 3T, an energizing circuit for the line relay 7H is completed. Such energizing circuit is from (+), through front contact 59 of relay 5S, back contact 55 of relay 5HP, front contact 52 of relay 5TRP, front contact 46 of relay FLR, through the windings of relay 7H, front contact 45 of relay FLR, front contact 51 of relay 5TRP, back contact 54 of relay 5HP, and front contact 58 of relay 5S, to (−).

It will be noted from the above discussion that the passing of the vehicle through track section 5T and its subsequent movement into track section 3T has pole-changed the pick-up circuit for relay 7H and thereby causes polar contact 80 to be actuated to its left-hand position. Since front contact 60 of relay 7H is closed, the signal 7SG at the head-block will display a yellow aspect indicating that a following train may move into the section 5T under a caution aspect. If such event did occur, however, the cab signal on the train would immediately give a restricting aspect because there is no code on the track rails of section 5T at this time.

Hence, as will be seen as the description progresses, in order to permit a following train movement, it will be necessary for the first train entering into the single stretch of trackway to reach track section 1T before a proceed aspect is registered in the cab signal of a train occupying track section 5T.

When the vehicle advances from section 3T into section 1T of the single stretch of track, the track relay 1TR and its respective track repeater relay 1TRP are both deenergized in accordance with the foregoing explanation with regard to the other track relays. With the track relay 1TR deenergized, its back contact 113 is closed to complete an energizing circuit for the code transmitter repeater relay 1-2CTP from (+), through the code transmitter 180CT, polar contact 125 of relay 1H in its left-hand position, front contact 124 of relay 1H, back contact 113 of the track relay 1TR, back contact 116 of relay ELR, through the windings of relay 1-2CTP, to (−). Hence, a 180 code is fed along the track rails of section 1T toward the on-coming vehicle, which 180 code rate is duplicated and decoded by the locomotive train carried equipment as described before. The deenergizing of the track repeater relay 1TRP drops its front contacts 111 and 112 respectively to interrupt the energizing circuit for the line relay 3H and also the biased neutral relay 3D. Similar to the discussion with the foregoing track sections, when relay 3H is dropped away opening its front contact 98, the line repeater relay 3HP is deenergized. With the line repeater relay 3HP deenergized front contact 29 is dropped away closing back contact 29 to provide an energizing circuit for the track relay 3TR from (BX), through the associated track transformer located at the receiving end of section 3T, along the track rails, now unshunted, inducing a pick-up circuit through the associated track transformer located at the exit end of the track section 3T, all locations relative to the direction of traffic assumed. This induced current flows over wire 90, back contact 26 of the track repeater relay 3TRP, back contact 29 of the line repeater relay 3HP, line wire 141, through the lower winding of the track relay 3TR, to (NX).

Further, the dropping of the line repeater relay 3HP opens its front contact 83 and closes back contact 83 to maintain an energizing circuit for the directional stick relay 3S formed by the closing of back contact 109 of relay 3V with the track relay 1TR dropped away closing contacts 32 and 33. Said energizing circuit being from (+), through back contact 83 of relay 3HP, stick contact 87 of relay 3S, through the windings of relay 3S, to (−). The dropping away of relay 3HP also closes its back contacts 84 and 85. Now that the track relay 3TR is energized and similarly, its track repeater relay 3TRP is once again picked up, front contacts 81 and 82 of relay 3TRP are again closed. Since the directional stick relay 3S is energized, the energizing circuit for the line relay 5H is pole changed, the energizing circuit being from (+), through front contact 89 of relay 3S, back contact 85 of relay 3HP, front contact 82 of relay 3TRP, back contact 76 of relay 6HP, back contact 73 of relay 6S, windings of relay 5H, back contact 72 of relay 6S, back contact 75 of relay 6HP, front contact 81 of relay 3TRP, back contact 84 of relay 3HP, and front contact 88 of relay 3S, to (−).

By reversing the polarity of the energizing circuit for the line relay 5H, the biased neutral relay 5D cannot pick up on such polarity and its back contact 65 remains closed to connect the code transmitter 75CT in the energizing circuit for the code transmitter repeater 5-6CTP. Also, with relay 5H now energized and its front contact 68 picked up, an energizing circuit for the line repeater relay 5HP is completed from (+), through front contact 68 of relay 5H, through the windings of relay 5HP, to (−). With relay 5HP energized, the closing of front contact 53 and the opening of back contact 53 of relay 5HP respectively, interrupts the stick circuit for the directional stick relay 5S, which in turn drops away its front contacts 57, 58 and 59 respectively. Further, with the picking up of relay 5HP, front contacts 54 and 55 of relay 5HP are closed, pole changing, once again, the energizing current for the line relay 7H and causing the polar contact 80 of line relay 7H to be operated to its right-hand position. When the polar contact 80 of line relay 7H is operated to its right-hand position and the neutral front contact 60 of relay 7H is closed, a green signal aspect is displayed at the signal 7SG located at the headblock, in accordance with the description of the operation of the signal circuits for the headblock signal.

Meanwhile, the opening of front contacts 111 and 112 due to the deenergization of the track repeater relay 1TRP also deenergizes the biased neutral relay 3D associated with track section 3T and, in accordance with the discussion with the relay 5D, its back contact 95 is closed, connecting the code transmitter 75CT in the energizing circuit for the code transmitter repeater relay 3-4CTP. Since, however, back contact 91 of relay 3TR is opened, the energizing circuit for relay 3-4CTP is interrupted and no code is fed along the track rails of track section 3T.

As the train moves out of section 1T beyond the single stretch of trackway, the system organization for controlling the signals in an easterly direction from said exit end of said single stretch of track is effective and has its circuits connected so as to interrupt the energizing circuit for the line relay 1H among others. When relay 1H is deenergized in accordance with the presence of the vehicle in the stretch of track adjacent the exit end of the single stretch of track, and its front contact 121 is dropped away thereby interrupting the energizing circuit for the line repeater relay 1HP, causing back contact 126 of relay 1HP to close, and with back contact 110 of the track repeater relay 1TRP closed, a pick-up circuit is completed for the track relay 1TR from (BX), through the associated track transformer located at the receiving end of section 1T, along the track rails, now unshunted, inducing a pick-up circuit through the associated track transformer located at the exit end of the track section 1T, all locations relative to the direction of traffic assumed. This induced current flows over wire 128, back contact 110 of relay 1TRP, back contact 126 of the relay 1HP, over wire 129, and through the lower winding of the track relay 1TR, to (NX).

Further, the dropping away of front contacts 122 and 123 of relay 1H and the respective closing of back contacts 122 and 123 reverses the polarity of the energizing current for the line relay 3H and the biased neutral relay 3D, front contact 98 of relay 3H picking up to complete an energizing circuit for the repeater relay 3HP from (+), through front contact 139, the windings of relay 3HP, to (−), back contact 95 of relay 3D remaining closed, the code transmitter 75CT still being connected in the energizing circuit for the code transmitter 3-4CTP. Of course, with the track relay 1TR again energized, its back contact 113 is held open to interrupt the energizing circuit for the code transmitter repeater 1-2CTP, and no code is fed along the track rails of track section 1T.

Considering traffic to be in the same east to west direction, and further considering that the operator desires to permit a following train movement, it will be noticed from the line diagrams shown in Figs. 2F through 2I that the first vehicle must pass from section 5T into section 3T before a "proceed with caution" aspect is displayed at the headblock signal 7SG, thereby indicating that track section 5T is clear. If, however, the vehicle enters section 5T at this time, it receives no code because the code transmitter 5-6CTP remains deenergized due to the dropping away of front contact 56 of the repeater relay 5HP, a condition caused by the presence of the first vehicle in section 3T. Hence, the second vehicle must wait in section 5T until the first vehicle has moved into section 1T.

Considering then that the first vehicle has passed into section 1T in accordance with the line diagram shown specifically in Fig. 2G, the presence of the second vehicle in track section 5T drops the track relay 5TR closing its back contact 62, and, along with the subsequent closing of front contact 56 of relay 5HP in accordance with the movement of the first vehicle into section 1T all as explained in the previous application, and further, with back contact 65 of the biased neutral relay 5D closed to connect the code transmitter 75CT in the energizing circuit for the code transmitter repeater 5–6CTP, a 75 code is fed along the track rails of section 5T. The locomotive carried equipment of the second vehicle receives, duplicates and decodes the 75 code and causes, among other things, a caution aspect to be displayed by the cab signal.

Hence, from the brief discussion of a following train movement, it can be seen that the present system organization provides following train movements in a single stretch of track, governed by cab signals, wherein a second vehicle may follow a first vehicle through the single stretch of track, providing there is always one clear track section dividing the two vehicles. Naturally, as the last vehicle passing in any particular direction completes its movement, the operator located at the exit end may then request clearance for a vehicle to pass from such opposite direction if so desired.

Considering next that traffic from east to west is desired, and that the last direction of traffic was from west to east as in the example just described, the operator at the exit end of the system would contact the operator at the west end to signify that the respective control levers ES and WS be moved to their left-hand positions accordingly. When the operator at the west end of the system organization as shown moves lever FS to its left-hand position, the energizing circuit for the control relay FLR is interrupted and the dropping away of its front contacts 45 and 46, respectively, interrupt the energizing circuit for the line relay 7H. Alternately, the movement of the lever ES to its left-hand position completes an energizing circuit for the control relay ELR from (+), through the winding of relay ELR, to (−).

The energizing of relay ELR picks up its front contacts 114, 115 and 116 respectively. The opening of back contacts 114 and 115 of relay ELR interrupts the energizing circuit for the line relay 3H and also takes energy off of the windings of the biased neutral relay 3D. With relay 3H deenergized, its front contact 139 drops away causing the repeater relay 3HP to be deenergized and, in turn, opens front contacts 84 and 85 of relay 3HP interrupting the energizing circuit for relay 5H. Similarly, relay 5D is no longer supplied with energy and further, front contact 68 of relay 5H drops away to deenergize the repeater relay 5HP. With relay 5HP deenergized, front contacts 54 and 55 are opened interrupting the energizing circuit for the line relay 7H. With the control relay FLR also deenergized because the lever FS is in the west position W, front contacts 45 and 46 of relay FLR are opened and back contacts 45 and 46 of said relay are closed. With back contacts 54 and 55 of relay 5HP now closed due to the deenergization of relay 5HP as described before, an energizing circuit for the line relay 6H is now completed from (+), through front contact 41 of relay 8H now energized, back contact 45 of relay FLR, front contact 51 of relay 5TRP, back contact 54 of relay 5HP, back contact 58 of relay 5S, through the windings of relay 6H, back contact 59 of relay 5S, back contact 55 of relay 5HP, front contact 52 of relay 5TRP, back contact 46 of relay FLR, front contact 42 of relay 8H, to (−). With relay 6H energized front contact 64 is picked up to complete an energizing circuit for the repeater relay 6HP from (+), through front contact 64 of relay 6H, through the windings of relay 6HP, to (−). With relay 6HP energized an energizing circuit for relay 4H is completed from (+), through front contact 75 of relay 6HP, front contact 81 of relay 3TRP, back contact 84 of relay 3HP, back contact 88 of relay 3S, the windings of relay 4H, back contact 89 of relay 3S, back contact 85 of relay 3HP, front contact 82 of relay 3TRP, front contact 76 of relay 6HP, to (−). Likewise, with relay 4H energized, its front contact 94 is closed to complete an energizing circuit for the repeater relay 4HP, from (+), through front contact 94, through the windings of relay 4HP, to (−). The energization of relay 4HP in turn completes an energizing circuit for the line relay 2H from (+), through front contact 105 of relay 4HP, front contact 111 of relay 1TRP, front contact 114 of control relay ELR, through the windings of relay 2H, front contact 115 of relay ELR, front contact 112 of relay 1TRP, and front contact 106 of relay 4HP, to (−).

Thus, it can be seen by the description of the tumble-down system, that the synchronous actuation of the control levers ES and FS to their relative positions will cause the system organization shown in Figs. 1A and 1B to be conditioned for the particular direction of traffic chosen. More particularly, the line relays are either all energized or all deenergized in accordance with the direction of traffic chosen and the corresponding relays required to make the system organization operative are likewise actuated accordingly (see Fig. 2J). When the line repeater relays are de-energized, it can also be seen that the respective front contacts in the energizing circuit for the corresponding directional stick relays are dropped away to prevent the energization of such directional stick relays when the direction of traffic is from right to left or from east to west. Since these directional stick relays are used only when the traffic is from west to east, it is necessary to provide the system with other directional stick relays such as 4S and 6S to perform the same function only these relays govern traffic in an east to west movement. While the contacts controlling the energization of the directional stick relays 3S and 5S were actuated directly by the operation of the various associated V relays for traffic moving in a west to east direction, the energization of the directional stick relays 4S and 6S are wholly dependent on the actuation of the associated track relays. Note, however, that the V relays, in effect, are repeaters of the track relay for movement of traffic in a west to east direction.

It will also be seen that the deenergization of the line repeater relays such as 3HP and 5HP, cause the front contacts of the respective relays to drop away, interrupting one path of energizing current for the code transmitter repeater relays identified as CTP with the appropriate numeral preceding. The corresponding back contacts of such line repeater relays do, however, close to form a second pick-up circuit for the code transmitter repeater relays as will be seen hereinafter. Likewise, the energization of the relay ELR opens back contact 116 in the energizing circuit for the code transmitter repeater relay 1–2CTP so that the relay 1–2CTP is now inactive throughout the movement of traffic from east to west as was relay 7–8CTP at the opposite end when the movement of traffic was from west to east.

Considering now that a train moves into section 1T and further considering that the traffic is moving from east to west and the entrance and exit ends of the track sections are likewise considered reversed from the former discussion for explanatory purposes, the train shunts the energizing circuit for the track relay 1TR which drops away, interrupting the energizing circuit for the track repeater relay 1TRP. With relay 1TRP deenergized front contacts 111 and 112 of relay 1TRP drop away to interrupt the energizing circuit for the line relay 2H causing its front contact 133 to drop away and its corresponding back contact 133 to be closed, completing an energizing circuit for the stop aspect of the headblock signal 2SG, all in accordance with the foregoing description with regard to the headblock signal 7SG when the traffic was in the opposite direction.

The dropping away of the track relay 1TR closes back contacts 32 and 33 of relay 1TR completing an energizing circuit for relay 3V from (+), through back contact 33 of relay 1TR, the windings of relay 3V, back contact 32 of relay 1TR, to (—). With relay 3V energized front contact 108 is picked up, and with front contact 107 of relay 4HP picked up in accordance with the conditions established by the movement of the control levers ES and FS, an energizing circuit for the code transmitter repeater relay 3–4CTP is completed from (+), through coding contact 96 of the code transmitter 180CT, front contact 95 of relay 3D, back contact 86 of relay 3HP, now deenergized, front contact 107 of relay 4HP, front contact 108 of relay 3V, through the windings of relay 3–4CTP, to (—). With the code transmitter repeater relay 3–4CTP now coding at a 180 rate, and with front contact 16 of relay 4HP closed, a 180 code is fed along the track rails of track section 1T toward the approaching vehicle over a circuit from (BX), through coding contact 13, front contact 16 of relay 4HP, through the associated track transformer at the leaving end of track section 1T, the directions being relative to the direction of traffic being assumed heretofore, over the rails of track section 1T. This 180 code is picked up in a manner heretofore described, duplicated and decoded and causes thereby a green aspect to appear on the cab signal indicator.

Similar also to the description with regard to relay 5S for traffic in the opposite direction, the stick relay 4S will not be picked up until the train enters section 3T, dropping track relay 3T and closing its corresponding back contact 92 thereby providing an energizing circuit from (+), through back contact 92 of relay 3TR, front contact 104 of relay 4HP, through the windings of relay 4S, to (—). With the directional stick relay 4S picked up and its corresponding front contacts 102 and 103 picked up, an energizing circuit having the polarity of the energy reversed is now prepared for the line relay 2H, and such energizing circuit will be effective when the train moves from track section 1T into section 3T. These front contacts 102 and 103 of relay 4S are held up by virtue of the stick circuit for the relay 4S which is similar to that described in the foregoing discussion of the opposite traffic movement, referring particularly to the directional stick relay 5S.

When the vehicle moves from section 1T into section 3T, the pick-up circuit for the track relay 1TR is the same as in the illustration described for traffic in the opposite direction. This is true throughout the entire passage of the vehicle from east to west and obviates the usual requirement for exchanging the source of feed and relay for a cab signaling system equipped for double direction running.

Hence, it will be seen by following through the system organization in a manner similar to that described heretofore for a train moving along the single stretch of track in a direction from west to east, doing so likewise for a train moving from east to west, the operation of the system organization is much the same once the various component parts have been properly conditioned in accordance with the particular train movement.

In accordance with another feature of the present invention, the code transmitter repeater relays each have a contact inserted in a second pick-up circuit for the track relay associated with each respective section. The purpose of such circuit arrangement is to provide a means whereby the track relay in a section of track may be picked up if a train once enters said section but backs out of the section in lieu of continuing on into the next track section in advance.

To illustrate this feature specifically, assume the system organization has been conditioned for traffic in a west to east direction in a manner hereinbefore described. Assume also that the train enters into track section 5T, dropping the track relay 5TR and causing a 180 code to be fed along the track rails of section 5T. Then, further assume such train to then back out of said section 5T. The usual pick-up circuit for the track relay 5TR is thus not completed since front contact 25 of the line repeater relay 5HP is still closed because the deenergization of said relay 5HP requires the train to register in the next track section in advance and drop the corresponding track relay.

Hence, a pick-up circuit has been provided in the present invention for such an event, the pick-up circuit extending from (BX), through coding contact 21 of the code transmitter repeater relay 7–8CTP, through the associated track transformer located at the entrance end of said section 5T, along the track rails, and through the associated track transformer at the exit end of section 5T, over wire 38, through back contact 22 of relay 5TRP, front contact 25 of relay 5HP, over wire 9, through coding contact 19 of the code transmitter repeater relay 5–6CTP, over wire 49, through the lower winding of track relay 5TR, to (NX).

It is understood of course that several other features which are now found in the art can be added to the present system organization to make it all inclusive. Some of such features may be acknowledging means, automatic braking systems, audible warning devices, and the like. However, for the purpose of simplicity these addition features have been deleted even though it is recognized that the immediate practice warrants the use of them.

Having thus described a cab signaling system for railroads using a two-rail alternating-current track circuit arranged for double direction running with coded energy being applied from either end according to the direction of traffic without exchanging the source of feed in the operating track relay, and having further shown one system organization illustrating a specific embodiment of the present invention, it is desired to be understood that this form is selected to facilitate in the disclosure of the invention rather than to limit the number of forms which it may assume; and, it is to be further understood that various modifications, adaptations, and alterations may be applied to the specific form shown to meet the requirements of practice, without in any manner departing from the spirit or scope of the present invention.

What I claim is:

1. In a cab signaling system for railroads for a stretch of track extending between passing sidings constituting a block and comprising several track sections, a coded track circuit for each of the track sections comprising alternating current code transmitters at the respective ends of the track section and a track relay at only one end, circuit means responsive to a train entering said track section from either end of the section for initiating the transmission of a selected track circuit code through the track rails toward the train by said code transmitter at the opposite end of the section, stick circuit means for maintaining said track relay normally energized by energy steadily transmitted normally through the track rails from the opposite end of the track section, pick-up circuit means for energizing said track relay after passage of a train, and code selecting means including said track relay for each of the track sections for selecting different code rates for transmission through the respective track sections, whereby cab signals can be controlled by selected track code transmitted toward a train proceeding in either direction through the block and the track relays are maintained picked up normally by steadily energized stick circuits.

2. A signaling system for railroads for a stretch of track extending between passing sidings constituting a block which is divided into several adjoining track sections comprising in combination, signals for governing entrance to the respective ends of the block, line circuit control means extending through the block for governing the aspects of said signals, an alternating current coded track circuit for each of the track sections for providing control energization for cab signals in vehicles passing through the block, said coded track circuit comprising alternating current code transmitting apparatus at the respective ends of the track section and a track relay at only one end, and code selecting means including said track relay and said line circuit control means for selecting different code rates for transmission through the respective track sections in both directions, said code selecting means being effective to render said code transmitting apparatus active to steadily energize the track rails of the associated track section normally and operable for the transmission of codes in either direction through the track rails in accordance with a designated direction of traffic when the associated track section becomes occupied by a train.

3. A signaling system for railroads according to claim 2 wherein said coded track circuit is normally effective to energize said track relay through a stick contact.

4. A signaling system for railroads according to claim 3 wherein a pick-up circuit is provided for said track relay which is dependent for energization of the track relay upon occupancy of the adjoining track section.

References Cited in the file of this patent

UNITED STATES PATENTS

| | | |
|---|---|---|
| 2,315,887 | Wallace | Apr. 6, 1943 |
| 2,316,961 | Kemmerer | Apr. 20, 1943 |
| 2,370,091 | Thompson | Feb. 20, 1945 |